No. 696,472. Patented Apr. 1, 1902.
P. NEUMANN.
STUD.
(Application filed May 25, 1901.)
(No Model.)

Witnesses:
R. Lloyd Howland.
Jules C. Hertzog.

Inventor,
Perez Neumann
by  Att'y.

UNITED STATES PATENT OFFICE.

PEREZ NEUMANN, OF NUREMBERG, GERMANY.

STUD.

SPECIFICATION forming part of Letters Patent No. 696,472, dated April 1, 1902.

Application filed May 25, 1901. Serial No. 62,224. (No model.)

*To all whom it may concern:*

Be it known that I, PEREZ NEUMANN, a subject of the King of Bavaria, residing at Nuremberg, Bavaria, Empire of Germany, have invented a new and useful Stud Adapted for Use as a Cravat-Holder, of which the following is a specification.

This invention relates to an improved cravat-holder consisting of a stud adapted to form a snap-fastener with the cravat and of such shape that the cravat is prevented from turning, as has been possible with studs and fasteners heretofore commonly employed.

It is well known that so-called "snap-fasteners" have been frequently used, more particularly with gloves. They have also been used in combination with spring-bands for fixing cravats; but the present invention consists not in the use of a snap-fastener such as has been hitherto employed for gloves, but its specific novelty consists in that the stud forming the fastening has a flattened shank and is so constructed that when the knob or head of the stud has been passed through the slot in the collar the cravat fastened thereon cannot be turned in any direction in consequence of the peculiar shape of the stud.

One embodiment of the invention is illustrated in the accompanying drawings, in which—

Figure 1:
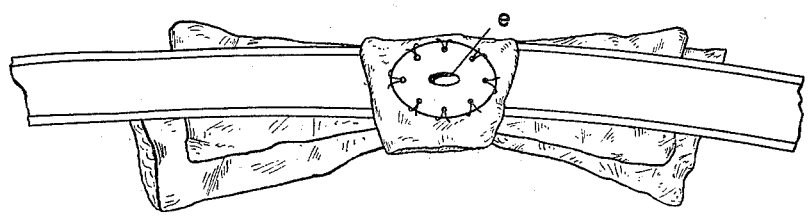
Figure 2:
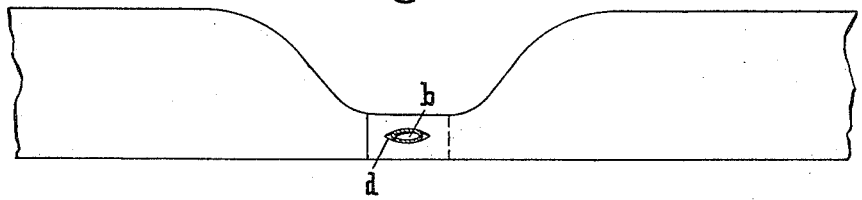
Figure 3:
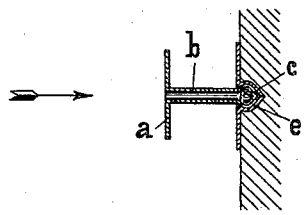

Figure 1 shows a cravat having a socket member applied thereto; Fig. 2, a section through the shank of the stud passing through the buttonhole of the collar; Fig. 3, a sectional view of the fastening completed, and Fig. 4 an elevation and plan view of the stud.

Figure 4:
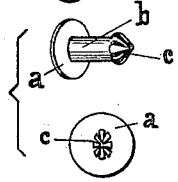

As may be seen by examining the drawings, the shank $b$ of the stud $a$ is flattened and provided with a flattened head $c$, which is preferably a spring one, as shown in Fig. 4—that is, the head $c$ is elliptical instead of circular in cross-section, the shortest diameter of said head being substantially the same length as the thickness of the shank. In other words, both the shank and head are relatively "flat" or thin in one direction, so that they can be easily passed through the collar-holes $d$ and will not distort the natural shape of said holes. The shank $b$ is provided at one end with the head $c$, as aforesaid, and at its other with an expanded base. The stud is simply passed through the collar-hole $d$ and inserted in the opening $e$ in the socket member on the cravat, Fig. 1, which, corresponding with the head $c$ of the stud $a$, is oval in shape, the stud being inserted by pressure. (See Fig. 3.) It will be seen that the head is substantially of the same form as the shank, both being elliptical and the longest diameter of the head extending parallel to the longest diameter of the shank.

It is evident without further explanation that when a stud made according to the present invention is employed any lateral turning or displacement of the cravat is entirely avoided, and by the flattened shape of the stud-shank the essential advantage is obtained that the collar, more particularly in the case of turned-down collars, is always maintained in the correct position—that is to say, it cannot turn on the common point of fastening of its ends.

Of course it is optional to make the socket member a spring one instead of the head $c$ of the stud, in which case the head of the stud $c$ may be solid. The stud may also be of any suitable shape. It may be made hollow or partially out of metal, bone, mother-of-pearl, or the like or be constructed in any suitable way.

Having thus described my invention, what I claim as new, and desire to secure by Letters Patent, is—

The herein-described necktie-fastener, consisting of a stud having an expanded base, a flattened shank, and a head which is elliptical in cross-section, the longest diameter of said head extending parallel to the longest diameter of the shank, and a socket member adapted to be attached to a cravat and to be resiliently engaged with the head of the stud.

In testimony whereof I affix my signature in presence of two witnesses.

PEREZ NEUMANN.

Witnesses:
 LEBERECHT HUBER,
 OSCAR BOCK.